United States Patent [19]
Lin

[11] Patent Number: 5,993,023
[45] Date of Patent: Nov. 30, 1999

[54] LIGHT GENERATING DEVICE FOR SCANNER

[76] Inventor: Bob Lin, No. 9, Lane 102, San-Min Rd., Taipei, Taiwan

[21] Appl. No.: 08/992,244

[22] Filed: Dec. 17, 1997

[51] Int. Cl.$^6$ ................................................. F21V 7/00
[52] U.S. Cl. .................... 362/223; 362/268; 362/224; 362/300; 362/307; 355/67; 358/474
[58] Field of Search .................... 362/307, 97, 217, 362/310, 224, 223, 308, 328, 329, 335, 268, 298, 300; 355/70; 358/474, 475

[56] References Cited

U.S. PATENT DOCUMENTS

| | | | |
|---|---|---|---|
| 4,186,431 | 1/1980 | Engel et al. ........................... | 362/223 |
| 4,422,100 | 12/1983 | Du Vall et al. ........................ | 362/217 |
| 4,734,836 | 3/1988 | Negishi .................................. | 362/223 |
| 4,963,895 | 10/1990 | Harada et al. ......................... | 362/223 |
| 5,537,240 | 7/1996 | Wun et al. ............................. | 362/223 |

*Primary Examiner*—Thomas M. Sember
*Attorney, Agent, or Firm*—Bacon & Thomas

[57] ABSTRACT

A light-generating device for a scanner is fixedly disposed onto the upper cover of the scanner, and includes a light generating element, a reflective surface, and a semi-transparent plate or a lens. This light generating device is used to replace the conventional flat mask or moveable tube. The light-generating device made according to the present invention may project a homogeneous light onto the exposure with which the chroma difference of the scanned image can be prevented.

11 Claims, 5 Drawing Sheets

LIGHT GENERATING DEVICE FOR SCANNER

FIELD OF THE INVENTION

The present invention relates to a light generating device, and more particularly, to a light generating device for a scanner that enables both negative and positive exposures to be readily scanned.

DESCRIPTION OF PRIOR ART

In one type of commercial scanner, the housing and the upper cover is each provided with a light source. In an alternative, it is possible to install only one light source in the housing or the upper cover. Generally, when a nontransparent print is scanned, the light source disposed within the housing will be switched on and projected toward the print to be scanned. Meanwhile, the supporting cartridge, in which an optical module is installed, and a reflective mechanism will be driven synchronically to capture the image of the print. The captured image will be further transmitted to the optical module.

When a positive or negative exposure is to be scanned, only a movable light disposed within the upper cover is switched on. The light source is controlled by a program. Firstly, the light source and the reflective mechanism disposed within the housing are reset at the starting position, and then those mechanisms are moved to conduct a scanning process. During the scanning, the light source and the reflective mechanism are synchronically passed over the exposure to be scanned. However, two individual mechanisms and a complicated circuit are needed to complete this scanning process. Otherwise, the moveable light within the upper cover and the reflective mechanism within the housing cannot be moved synchronically. Thus complicates the assembling process and the cost is inevitably increased.

On the other hand, when the light source is a flat-type light source installed on the upper cover, a transparent plate must be provided in which a layer of photosensitive oily material is deployed. Pairs of light tubes are disposed at both ends of the photosensitive layer respectively. By the provision of the photosensitive layer, the light emitted from the two tubes can be evenly projected onto the exposure. However, the design of the transparent plate is complicated and only by a sophisticated calculation can an acceptable performance can be attained. Inevitably, the manufacturing cost is increased.

SUMMARY OF THE INVENTION

It is the objective of this invention to provide a light-generating device in which the problem encountered by the conventional scanner can be readily solved.

The light-generating device made according to the present invention generally includes a casing having a receiving chamber, a light generating device, a reflective surface, and a semi-transparent device. This light generating device can be readily disposed onto the upper cover. The light emitted from the light generating device can be evenly projected over the print or exposure to be scanned.

DETAILED DESCRIPTION OF THE PREFERRED EMBODIMENT

Figure 1:
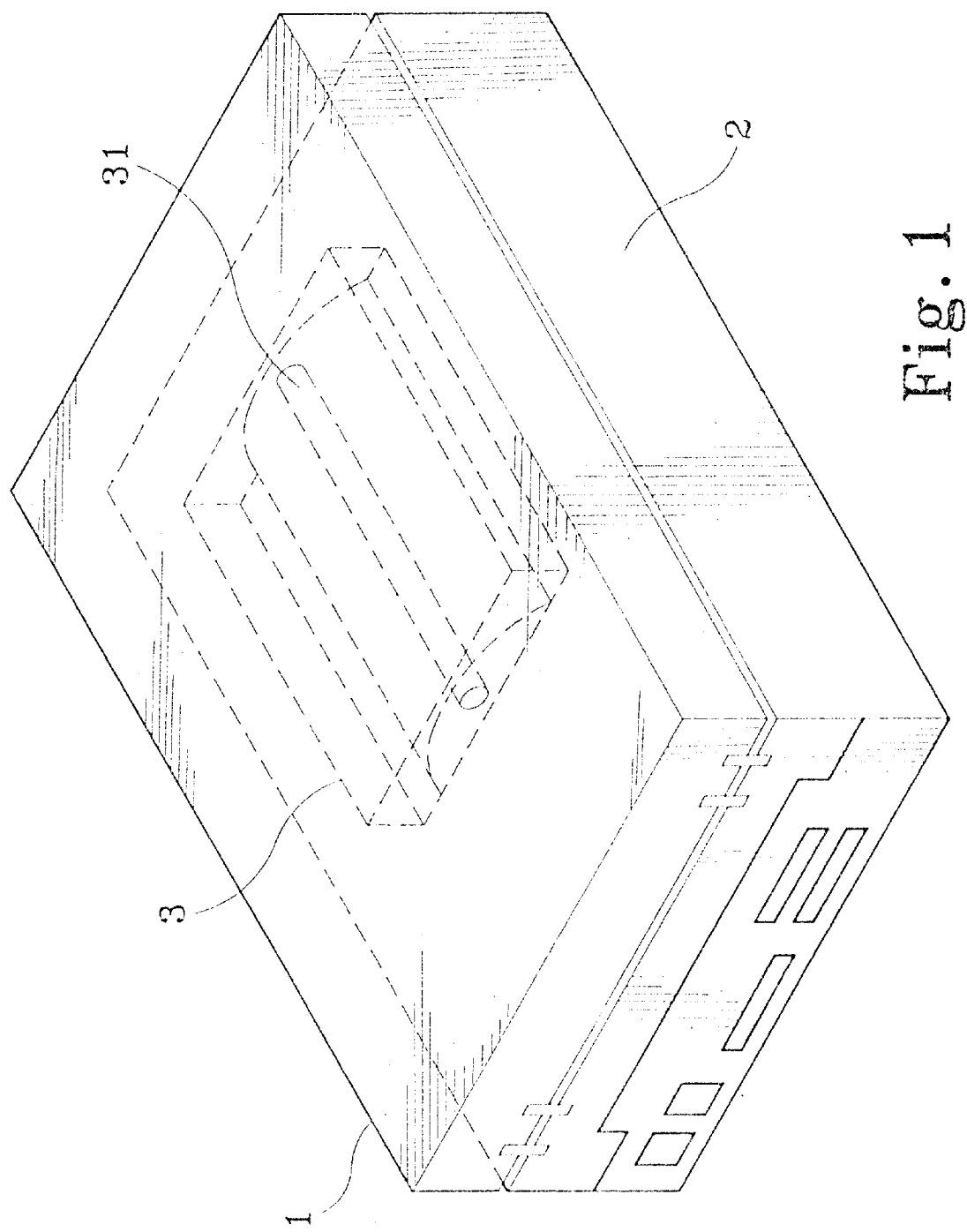
FIG. 1 is a light-generating device made according to the present invention.

FIG. 1 shows the configuration of a light generating device made according to the present invention. The scanner generally includes a housing 2, and a moveable upper cover 1 that is disposed on the housing 2. The housing 2 includes a driving mechanism and a scanning module (not shown). A light generating device 3 includes a light generating element 31 is disposed within the upper cover 2.

Figure 2:
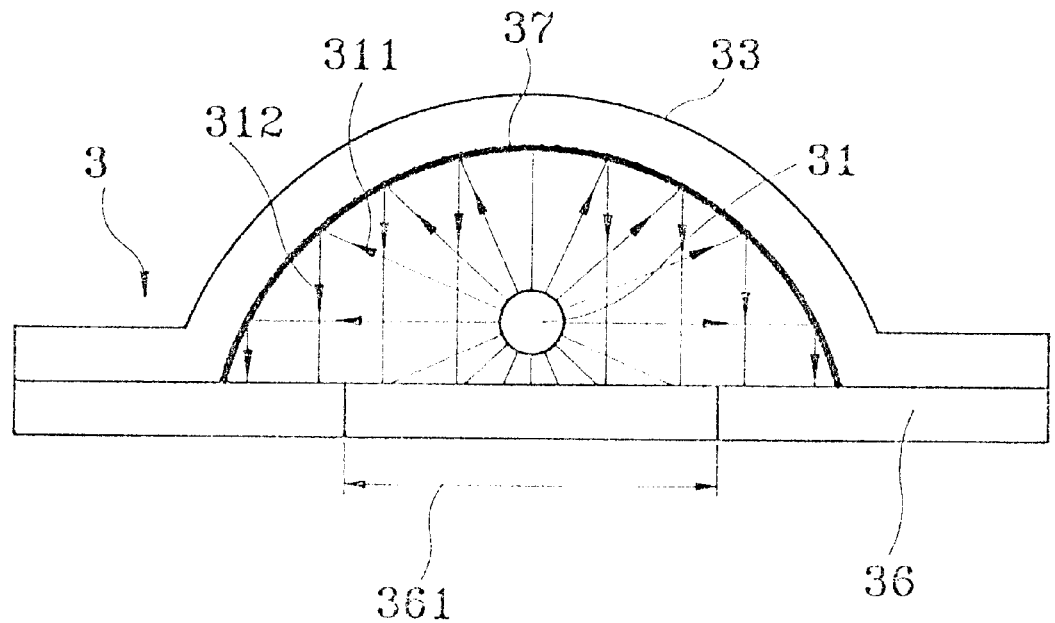
FIG. 2 is a cross sectional view of a first embodiment of the light generating device in which the semi-transparent plate is not yet installed.

FIG. 2 shows a cross sectional view of the light-generating device in which the semi-transparent plate is not yet installed. As shown in FIG. 2, the light generating device 3 includes a parabolic casing 33 disposed within the upper cover 1. The light generating element 31 is disposed right at the focal point F of the parabolic casing 33. The inner parabola surface of the parabola casing 33 is mounted with a reflective surface 37 that is made from a mirror, aluminum foil or metal foil. The light emitted from the light generating element 31 and reflected by the reflective surface 37 may perpendicularly project onto the exposure 36 to be scanned. Consequently, the illumination of the exposure is homogeneous in all areas. However, light emitted from the light generating element 31 and not reflected by the reflective surface 37 may form an over-exposed area 361 on the exposure 36. The final scanning quality will be therefore influenced.

Figure 3:
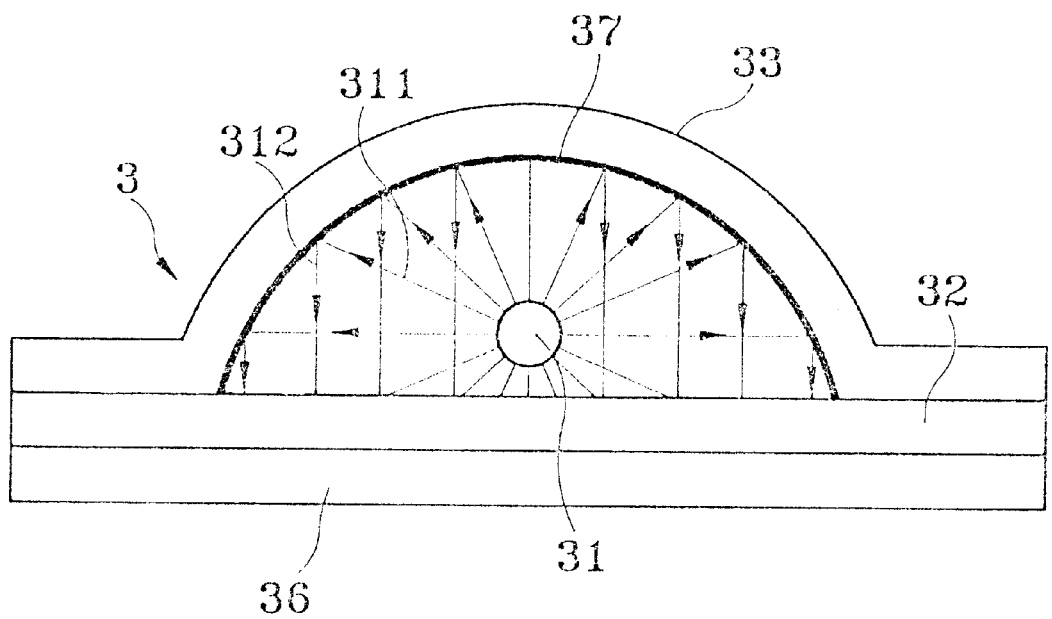
FIG. 3 is a cross sectional view of a first embodiment of the light-generating device in which the semi-transparent plate is installed.

FIG. 3 shows a first embodiment of the light generating device made according to the present invention in which a semi-transparent plate 32 is installed. In this embodiment, the semi-transparent plate 32 is disposed between the casing 33 and the exposure 36. As a result, the projected illumination onto the exposure will become evenly distributed and the over-exposed area 361 can be prevented. The semi-transparent plate 32 can be a glass plate having a coarse surface or an acrylic plate.

Figure 4:
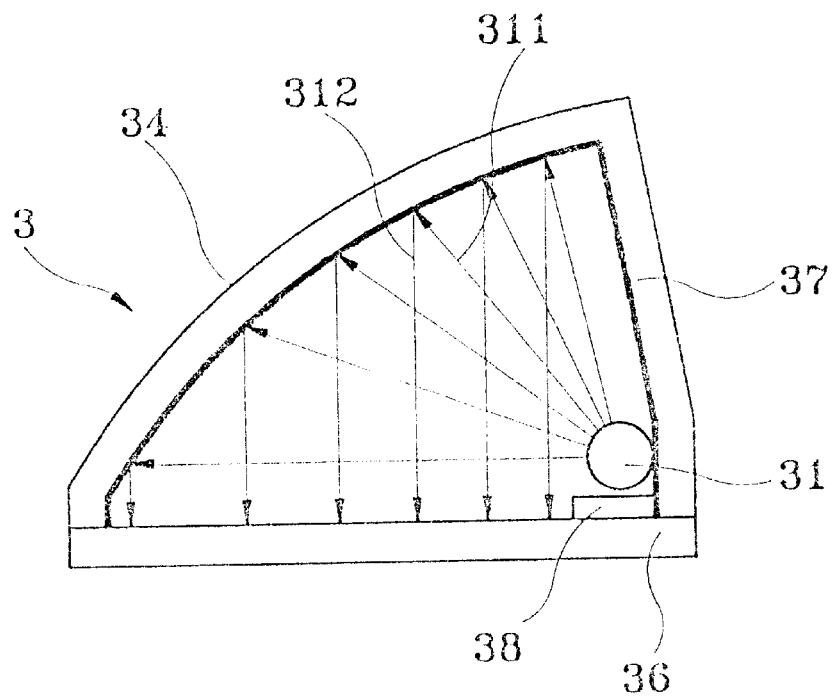
FIG. 4 is a cross sectional view of a second embodiment of the light generating device in which the semi-transparent plate is not yet installed.

Referring to FIG. 4, a cross sectional view of a second embodiment of the light generating device is shown.

Figure 5:
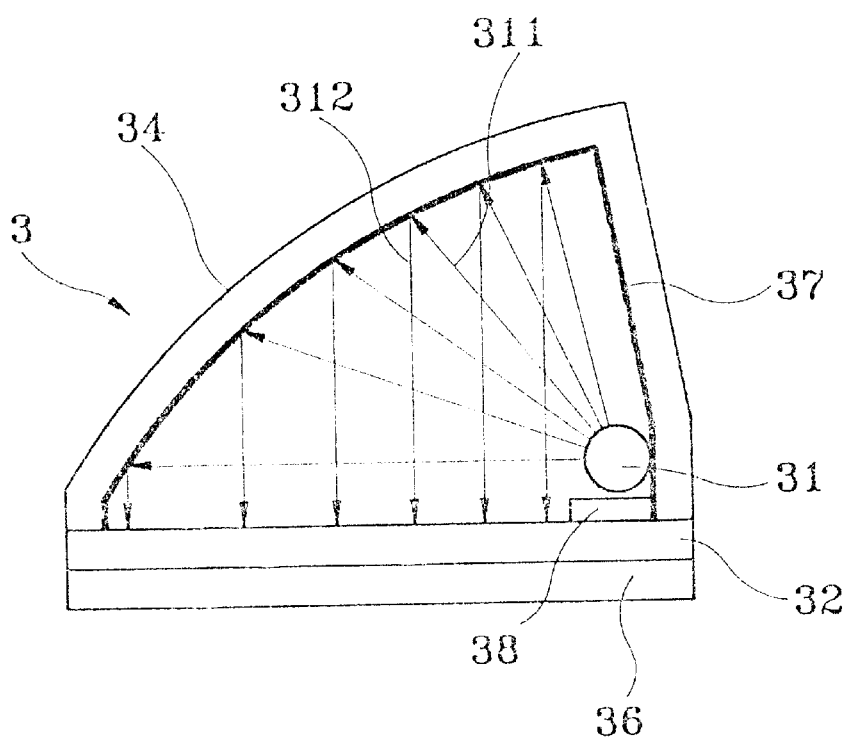
FIG. 5 is a cross sectional view of a second embodiment of the light-generating device in which the semi-transparent plate is installed.

The light generating device 3 includes a parabolic casing 34 in which a light-generating element 31 is disposed at the focal point of the parabolic casing 34. The inner parabola surface of the parabola casing 33 is mounted with a reflective surface 37. The light emitted from the light 312 generating element 31 and reflected by the reflective surface 37 may perpendicularly project onto the exposure 36 to be scanned. However, a masking plate 38 is disposed between the light generating element 31 and the exposure 36. Accordingly, the light from the light generating element 31 that directly projects onto the exposure 36 can therefore be prevented. By this arrangement, the over-exposed area 361 on the exposure 36 can be prevented. Alternatively, a semi-transparent plate 32 can be disposed between the light generating device 3 and the exposure 36, as clearly shown in FIG. 5. As a result, a more homogenous illumination of the exposure 36 can be attained.

Figure 6:
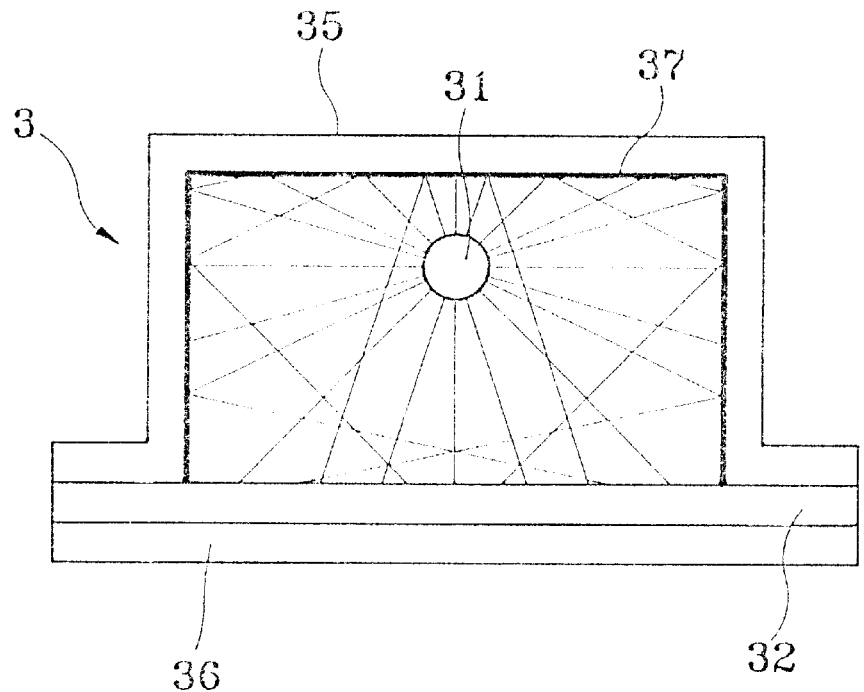
FIG. 6 is a cross sectional view of a third embodiment.

Referring to FIG. 6, a cross sectional view of a third embodiment of the light-generating device. As shown in FIG. 6, the light generating device 3 includes an oblong casing 35. And the inner surface of the oblong casing 35 is is mounted a reflective surface 37 and the light generating element 31 is disposed at a suitable position within the casing 35. By this arrangement, the light emitted from the light generating element 31 and reflected by the reflective surface 37 may suitably project onto the exposure 36 through the semi-transparent plate 32. Consequently, the illumination of the exposure is homogeneous in all areas. The reflective surface 37 and semi-transparent plates can be made from the same materials as in the above-described embodiments.

Figure 7:
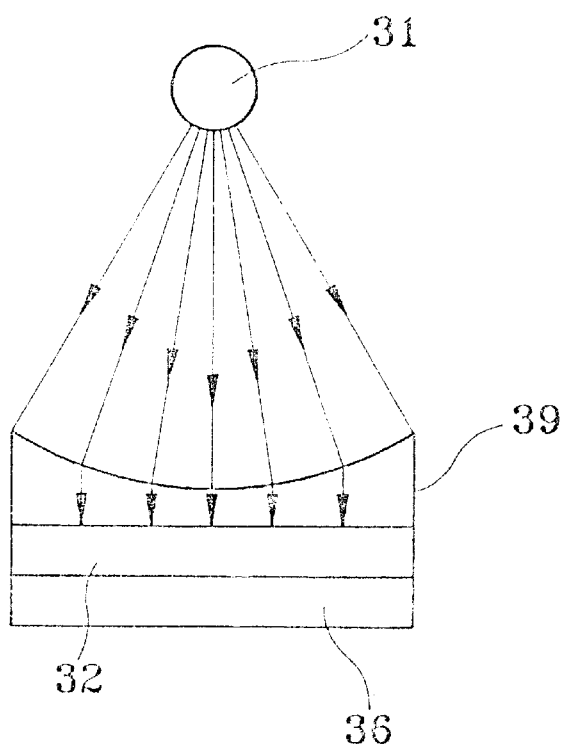
FIG. 7 is still a cross sectional view of a fourth embodiment.
Figure 8:
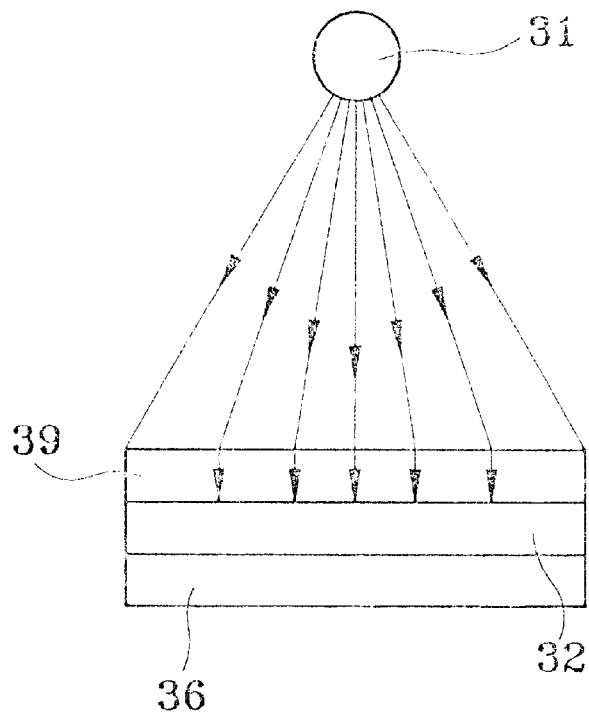
FIG. 8 is still a cross sectional view of a fifth embodiment.

Referring to FIGS. 7 and 8, a cross sectional view of the fourth and fifth embodiments is respectively shown. In these embodiments, a lens 39 is disposed between the light generating element 31 and the semi-transparent plate 32. The lens 39 is a concave lens or a Fresnel lens that is widely used on a commercial scanner. The light generated 25 by the light generating element 31 is firstly refracted by the lens 39 and then the incident light 311 will be emitted in parallel. The parallel light beam then projects onto the exposure 36 after it passes through the semi-transparent plate 32.

Figure 9:
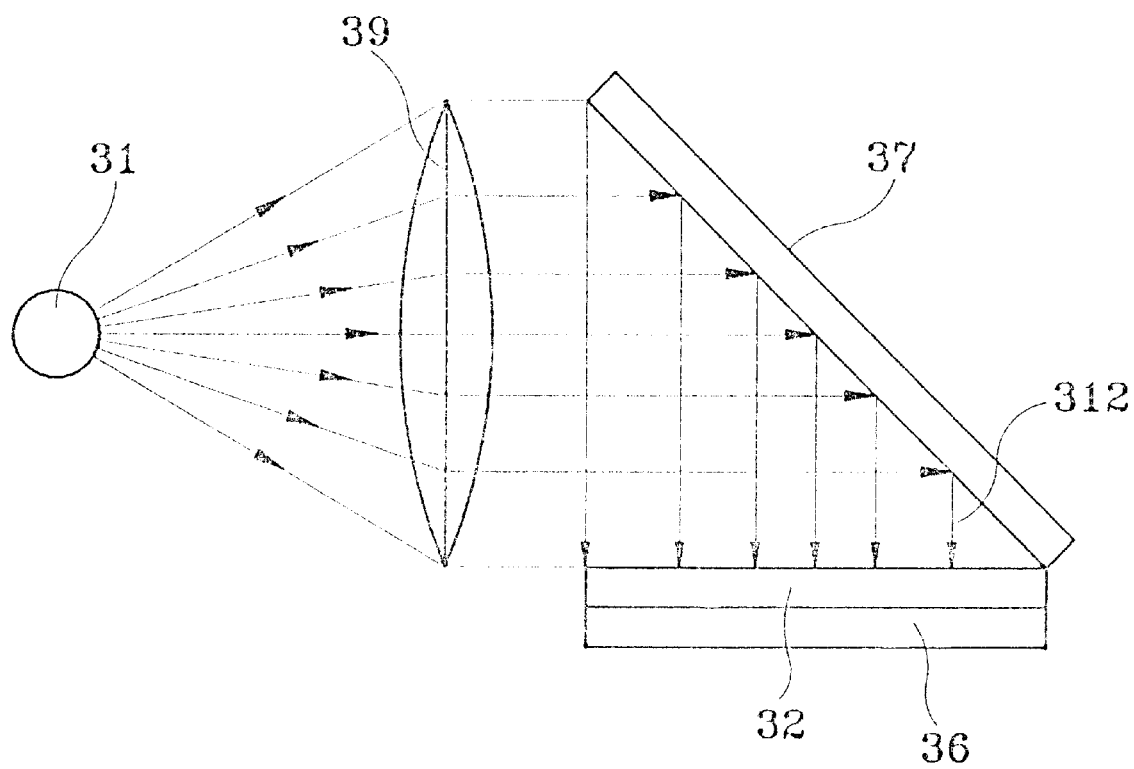
FIG. 9 is still a cross sectional view of a sixth embodiment.

Referring to FIG. 9, the cross sectional view of the sixth embodiment is shown. In this alternative, a convex lens 39 is disposed between the light generating element 31 and the reflective surface 37. There is a selected angle between the reflective surface 37 and the lens 39. As a result, the light emitted from the light emitting element 31 will be firstly refracted by the convex lens 39. Then the refracted light beam that is now a parallel light beam 312 will project perpendicularly to the semi-transparent plate 32. Consequently, a homogeneous illumination on the exposure 36 can be attained.

From the forgoing description, the light generating device can be readily disposed onto the upper cover and the laborious assembling work can be suitably reduced. The overall configuration features a compact and simplified configuration. Furthermore, the manufacturing cost is therefore reduced.

What is claimed is:

1. A light generating device fixed to an upper cover of a scanner and arranged to illuminate an entire area of exposure to be scanned without relative movement between said light generating device and said exposure, said light generating device comprising;

a casing having a receiving chamber;

a light generating device fixedly disposed within said receiving chamber of said casing to provide a light source during a scanning process;

a reflective surface disposed within an inner surface of said casing for reflecting light generated by said light generating element onto said exposure; and a semi-transparent plate disposed between said light source and said exposure and arranged to permit only light reflected by said reflective surface from reaching said exposure, thereby providing homogeneous illumination of said entire area of said exposure without over-exposure due to non-reflected light from said light source.

2. A light generating device as recited in claim 1, wherein a cross-sectional shape of said casing is selected from the group consisting of a parabola, a semi-parabola, and an oblong shape.

3. A light generating device as recited in claim 1, wherein said casing is a parabolic casing and said light generating element is disposed at a focal point of said parabolic casing.

4. A light generating device as recited in claim 1, wherein said casing is a semi-parabolic casing and said light generating element is disposed at a focal point of said semi-parabolic casing.

5. A light generating device as recited in claim 1, wherein said casing is an oblong casing and said light generating element is disposed at a position in said oblong casing arranged to cause the light beam to be homogeneously projected onto said exposure after it is reflected.

6. A light generating device as recited in claim 2, wherein a masking plate is disposed within said casing and said semi-transparent plate.

7. A light generating device as recited in claim 1, wherein said reflective surface is selected from the group consisting of a mirror, an aluminum foil, a metal foil, and a diffusing element.

8. A light generating device as recited in claim 1, wherein a lens is disposed between said light generating element and said reflective surface.

9. A light generating device as recited in claim 8, wherein there is a selected angle between said reflective surface, said lens, and said exposure such that light reflected by said reflective surface is projected onto said exposure.

10. A light generating device as recited in claim 1, wherein said semi-transparent plate is selected from the group consisting of a glass plate having a coarse surface and an acrylic plate.

11. A light generating device fixed on an upper cover of a scanner and arranged to provide homogeneous illumination of an entire area of an exposure to be scanned without relative movement between said light generating device and said exposure, said light generating device comprising:

a casing having a receiving chamber;

a light generating element fixedly disposed within said receiving chamber of said casing to provide a light source during a scanning process;

a lens disposed within said casing parallel to said light generating element, the light emitted from said light generating element being projected onto said entire area of said exposure after it is refracted by said lens, and a semi-transparent plate disposed between the lens and the exposure, wherein said lens is selected from the group consisting of a convex lens, a concave lens, and a Fresnel lens.

* * * * *